(12) United States Patent
Dee et al.

(10) Patent No.: US 6,191,917 B1
(45) Date of Patent: *Feb. 20, 2001

(54) THIN FILM TAPE WRITE HEAD FOR DUAL FREQUENCY OPERATION

(75) Inventors: Richard H. Dee; Bradley N. Engel, both of Louisville, CO (US)

(73) Assignee: Storage Technology Corporation, Louisville, CO (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 18 days.

(21) Appl. No.: 09/150,803

(22) Filed: Sep. 10, 1998

(51) Int. Cl.[7] ........................................ G11B 5/31
(52) U.S. Cl. ............................................. 360/126
(58) Field of Search ...................... 360/126, 119

(56) References Cited

U.S. PATENT DOCUMENTS 5,609,971 * 3/1997 Matono et al. ................. 360/126
5,801,910 * 9/1998 Mallary ........................... 360/126

FOREIGN PATENT DOCUMENTS 0 401 983  12/1990  (EP) .
2-183408   7/1990  (JP) .

* cited by examiner

Primary Examiner—Robert S. Tupper
(74) Attorney, Agent, or Firm—Brooks & Kushman P.C.

(57) ABSTRACT

A thin film write head allowing substantially the same amplitude of input current to be used for writing both data transitions and equalization pulses onto a magnetic tape is described. Data transitions occur at a frequency no greater than a data frequency. Each equalization pulse is a signal written at an equalization frequency much greater than the data frequency. The thin film write head includes a top pole, a bottom pole, and a conductive coil between the top and bottom poles. The top pole, bottom pole, and conductive coil form an electromagnet for writing the write-equalized digital data stream onto the magnetic tape by converting an input current through the conductive coil into a head field. Conversion of the input current at the data frequency results in substantially the same head field amplitude as conversion of the input current at the equalization frequency. This may be achieved by increasing the gap depth to cause saturation at the data frequency.

18 Claims, 6 Drawing Sheets

THIN FILM TAPE WRITE HEAD FOR DUAL FREQUENCY OPERATION

TECHNICAL FIELD

The present invention relates to thin film tape write heads for recording digital data transitions and equalization pulses onto magnetic tape.

BACKGROUND ART

A write head converts a current signal carrying digital information into a magnetic field. This magnetic field impresses a flux pattern on a magnetic tape as the tape passes the write head. A read head then senses the recorded flux pattern to recover the digital signal. One common input write signal is shown in FIG. 1a. Binary signal 20 is converted to input write signal 22. Input write signal 22 is a non-return-to-zero inverted (NRZI) signal. In this particular NRZI code, each one is represented by a data transition, one of which is indicated by 24, and each zero is indicated by the lack of a transition as related to a data clock in receiver electronics. When input write signal 22 is fed to a write head, and tape 26 is moved over the write head, data fields 28,30 are written onto tape 26 as shown in FIG. 2a. Each data transition 24 causes a change in magnetization direction between adjacent data fields 28,30.

When tape 26 is passed over a read head, data fields 28,30 are converted to read output signal 32. Electronics connected to the read head use means such as a threshold detector to recover binary signal 20 from read output signal 32. However, as can be seen in FIG. 3a, a long string of zeros in binary signal 20 causes a large swing in read output signal 32. This complicates the read electronics.

One way of considering the problem is that the long string of zeros in binary signal 20 results in long data field 30 on tape 26. Flux field 30 is a magnet. The greater the length of data field 30, the greater the strength of the resulting magnet. Therefore, reducing the large swings in amplitude of read output signal 32 can be achieved by breaking up long data field 30.

A method for breaking up long data field 30 is to include short pulses at high frequency in input write signal 22. This produces a signal known as write-equalized input signal 34 shown in FIG. 1b. Equalization pulse 36 is added to input write signal 22 at locations representing some or all of the zeros in binary signal 20. Equalization pulse 36 consists of a signal outside the effective frequency range of the read head and channel. When write-equalized signal 34 is written onto tape 38, as shown in FIG. 2b, equalization pulse 36 is written as high frequency field 40. This may be likened to high frequency erasure as the high frequency recording is not reproduced by the read head.

When tape 38 including high frequency fields 40 is read by the read head, each high frequency field 40 is sensed as a region producing no flux density. Read output signal 42, shown in FIG. 3b, therefore does not include the large amplitude swings seen in read output signal 32 from tape 26 not having high frequency fields 40. Hence, simpler thresholding circuitry may be used in read electronics.

Many techniques are possible for determining where to place equalization pulses 36 in write-equalized input signal 34. For example, each zero in binary signal 20 can generate a corresponding equalization pulse 36. The technique for generating the pattern shown in FIG. 1b together with additional techniques for generating write-equalized input signal 34 and a discussion of write equalization is included in "Write Equalization For Generalized (d,k) Codes" by Richard C. Schneider, IEEE TRANSACTIONS ON MAGNETICS, Vol. 24, No. 6, November 1988, pp. 2533–2535, which is hereby incorporated by reference.

A cross-sectional view of a prior tape head for writing write-equalized input signal 34 onto tape 38 is shown in FIG. 4. Write head 50 includes bottom pole 52, top pole 54, and conductive coil 56 which together form an electromagnet. Referring to FIGS. 2b and 4, operation of write head 50 will be described. When current is applied to conductive coil 56, a magnetic field is produced across the gap, shown generally by 58. As tape 38 moves past gap 58, fields 28,30,40 are written onto tape 38.

One difficulty with prior tape head 50 is that the amplitude of input current required to produce a desired magnitude of magnetic field at gap 58 for equalization pulse 36 is much greater than the amplitude of current required to produce a magnetic field at gap 58 that has substantially the same magnitude for data transition 24. This results in complicated write equalization circuitry to produce write-equalized input signal 34.

Other difficulties arise if sufficient equalization cannot be added when tape 38 is written. First, complicated read equalization circuitry is required to reshape detected data transitions 24. This reshaping may require boosting high frequency components which may degrade the read signal-to-noise ratio. Second, the lack of sufficient equalization causes larger swings in the magnetization seen by the read head. These larger swings increase distortion due to nonlinearities in the read head. Third, record depth is greater than necessary since low frequency signals record at greater depth on tape 38 than high frequency signals. Increased record depth may result in degraded overwrite of tape 38 and limited range on the velocity of tape 38 over head 50.

What is needed is a thin film write head that does not require substantially greater input current magnitude for equalization pulse 36 than for data transition 24 to produce substantially equal magnetic field strength amplitude in gap 58. This tape head should be economical to produce and should be similar in construction to prior tape heads.

SUMMARY OF THE INVENTION

It is an object of the present invention to provide a thin film tape head that does not require a substantially greater input current magnitude to produce equalization pulses than to produce data transitions for a desired magnetic field level.

Another object of the present invention is to provide a thin film tape head that produces substantially the same field strength on a magnetic tape for data fields and for high frequency equalization fields.

Still another object of the present invention is to provide a thin film write head that is economical to produce.

Yet another object of the present invention is to provide a thin film write head that, when used in a tape deck, requires simpler write equalization circuitry.

A further object of the present invention is to provide a thin film write head that, when used in a tape deck, requires simpler read equalization circuitry.

A still further object of the present invention is to provide a thin film write head that, when used in a tape deck, improves read signal-to-noise ratio.

Yet another object of the present invention is to provide a thin film write head that, when used in a tape deck, reduces read distortion.

Yet a further object of the present invention is to provide a thin film write head that, when used in a tape deck, produces a record depth that is generally independent of tape media thickness and write current magnitude.

Yet a still further object of the present invention is to provide a thin film write head that, when used in a tape deck, allows uniform recording at various tape velocities.

In carrying out the above objects and other objects and features of the present invention, a thin film write head is provided for writing a write-equalized digital data stream onto a magnetic tape. The write-equalized data stream includes data transitions and equalization pulses. The data transitions occur at a frequency no greater than a data frequency. Each equalization pulse is a signal written at an equalization frequency much greater than the data frequency. The thin film write head includes a top pole, a bottom pole, and a conductive coil disposed between the top and bottom poles. The top pole, bottom pole, and conductive coil form an electromagnet for writing the write-equalized digital data stream onto the magnetic tape by converting an input current through the conductive coil into a head field. The top pole and bottom pole are designed such that conversion of the input current at the data frequency results in substantially the same head field amplitude as conversion of the input current at the equalization frequency. This allows substantially the same amplitude of input current to be used for writing both data transitions and equalization pulses onto the tape.

In an embodiment of the present invention, the data frequency is no greater than 3 MHZ and the equalization frequency is between 16 MHZ and 100 MHZ.

In another embodiment, the tape has a tape surface written as it passes a gap in the electromagnet. The gap includes a region having the top pole parallel to the bottom pole and having both poles extending in a direction normal to the tape surface. The top pole is separated from the bottom pole by a narrow insulating gap layer. The gap has a gap depth defined as the length of the narrow insulating gap layer in the direction normal to the tape surface. Having the conversion of the input current at the data frequency result in substantially the same head field amplitude as the conversion of the input current at the equalization frequency is achieved by adjusting the gap depth.

In still another embodiment, the top pole and the bottom pole comprise at least one element from cobalt, nickel, and iron.

In a further embodiment where the top pole and the bottom pole are comprised of cobalt-zirconium-tantalum, the gap depth is between 5 micrometers and 10 micrometers. In a refinement, the gap depth is 8 micrometers.

Another thin film write head is provided that includes a first region for writing equalization pulses by converting input current with a first amplitude at the equalization frequency to magnetic flux through magnetization rotation. The write head also includes a second region for writing data transitions by converting input current with a second amplitude at data frequencies to magnetic flux through domain movement. The second region is designed to saturate such that, if the first amplitude is substantially equal to the second amplitude, the magnetic flux produced by magnetization rotation will produce substantially the same field strength on the tape as the magnetic flux produced by domain movement. In an embodiment, the first region and the second region are common.

Another thin film write head is provided that includes a substrate having an end over which the magnetic tape will pass. An insulation layer is deposited on the substrate. A magnetic bottom pole is deposited on the insulation layer. A coil structure is built over a first portion of the bottom pole located away from the end of the substrate over which the magnetic tape will pass. An insulating gap layer is built over the coil structure and a second portion of the bottom pole. The second portion defines a region located near the end of the substrate over which the magnetic tape will pass and not covered by the coil structure. A magnetic top pole is deposited on the gap layer. The top pole, bottom pole, and coil structure form an electromagnet for writing the write-equalized digital data stream onto the magnetic tape by converting an input current through the coil structure to a head field. The write head has a gap formed by the second portion of the bottom pole, a portion of the gap layer above the second portion of the bottom pole, and a portion of the top pole above the second portion of the bottom pole. The gap has a gap depth defined as the length of the gap layer above the second portion of the bottom pole in a direction normal to the tape surface. The gap depth is designed such that conversion of the input current at the data frequency results in substantially the same head field amplitude as conversion of the input current at the equalization frequency.

A tape deck for writing write-equalized digital data streams onto magnetic tape is also described. The tape deck includes a host interface for receiving data from a host processor and for producing an input write signal with a data format suitable for writing on the tape. A write equalizer receives the input write signal and produces a write-equalized input signal comprising data transitions and equalization pulses. A write driver converts the write-equalized input signal into a write current. A thin film write head converts the write current into a head field. The write head includes a top pole, a bottom pole, and a conductive coil disposed between the top pole and the bottom pole, the top pole, bottom pole, and conductive coil forming an electromagnet. The conversion of write current at the data frequency results in substantially the same head field amplitude as conversion of write current at the equalization frequency, thereby allowing substantially the same amplitude of input current to be used for writing both data transitions and equalization pulses onto the tape.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 2a is a schematic drawing of a tape including magnetic zones of opposite polarity written by the input write signal of FIG. 1a;

BEST MODE FOR CARRYING OUT THE INVENTION

Figure 4:
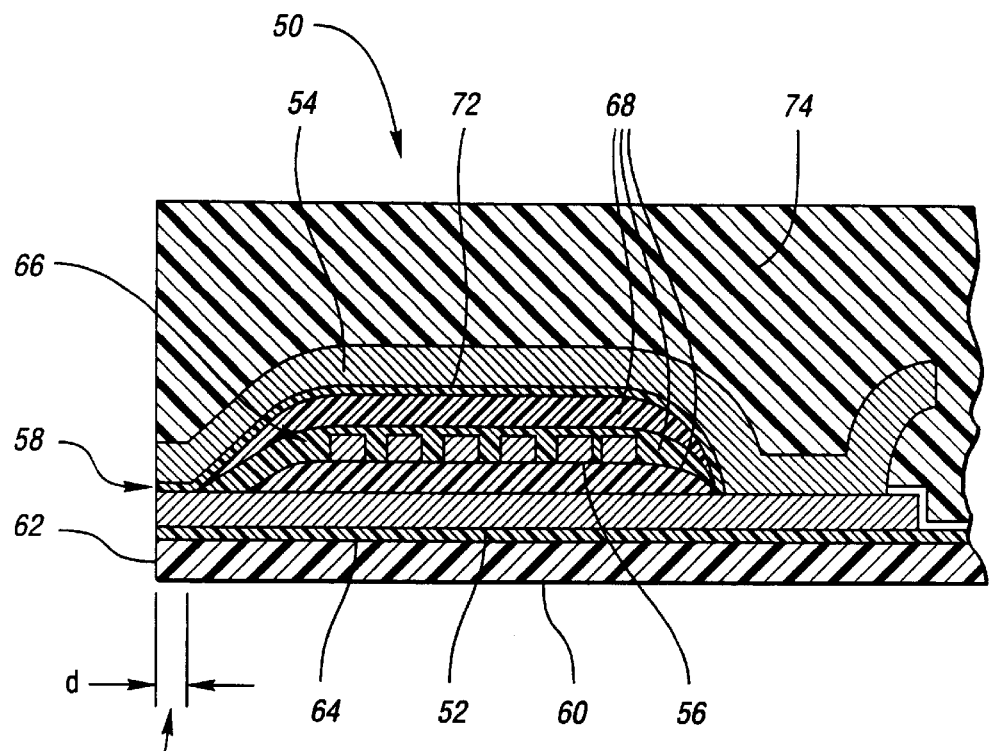
FIG. 4 is a conceptualized cross-sectional drawing of a prior thin film write head.

Referring now to FIG. 4, a conceptualized cross-sectional drawing of a prior thin film write head is shown. Write head 50 includes substrate 60 typically made from AlTiC. Substrate 60 has an end 62 over which the surface of magnetic tape 38 will pass. Insulation layer 64, typically made from alumina, is deposited on substrate 60. Magnetic bottom pole 52 is deposited on insulation layer 64. Coil structure 66 is built over a portion of bottom pole 52 located away from substrate end 62. Coil structure 66 may be built by embedding conductive coil 56, typically made from copper, in the center layer of three photoresist planars 68. Thin insulating gap layer 72, typically made of alumina, is deposited over coil structure 66 and a portion of bottom pole 52 near end 62 of substrate 60. Top pole 54 is deposited over gap layer 72 and a portion of bottom pole 52 not covered by gap layer 72. Bottom pole 52 and top pole 54 extend in the direction normal to the surface of tape 38 as it passes over write head 50. Bottom pole 52 and top pole 54 are typically constructed of an alloy or amorphous mixture including at least one of the elements cobalt, nickel, and iron. The material chosen for poles 52,54 must have appropriate magnetic, electrical, and physical properties. Protective layer 74, typically alumina, is deposited over top pole 54.

In an alternative construction, insulating gap layer 72 may be deposited between bottom pole 52 and coil structure 66 instead of between coil structure 66 and top pole 54.

Top pole 54, bottom pole 52, and conductive coil 56 in coil structure 66 form an electromagnet. Input current through conductive coil 56 is converted by the electromagnet to a head field at gap 58. The thickness of gap 58 is determined by the thickness of gap layer 72 over end 62 of substrate 60. Gap depth d, shown generally by 76, is defined as the length of gap layer 72, in the direction normal to the surface of tape 38 as it passes over write head 50, above bottom pole 52 where bottom pole 52 is not covered by coil structure 66.

Tape head 50 shown in FIG. 4 may be used in multiples for narrow track longitudinal serpentine data tape recording. The tape tracks are laid down on tape 38 N tracks at a time using M passes of tape 38 over head 50 assuming a different transverse location across tape 38 each pass. Tape 38 passes in opposite directions each pass thus filling tape 38 with N×M tracks. For the embodiments described herein, tape 38 travels at a speed of 2 meters per second over tape head 50. The width of gap 58, approximately equal to the width of fields 28, 30, 40 written onto tape 38, is 36 micrometers. The length of gap 58 is the thickness of gap layer 72 in gap 58 or approximately 0.6 to 0.7 micrometers. In prior tape head 50, gap depth 76 is 3 micrometers.

Figure 5:
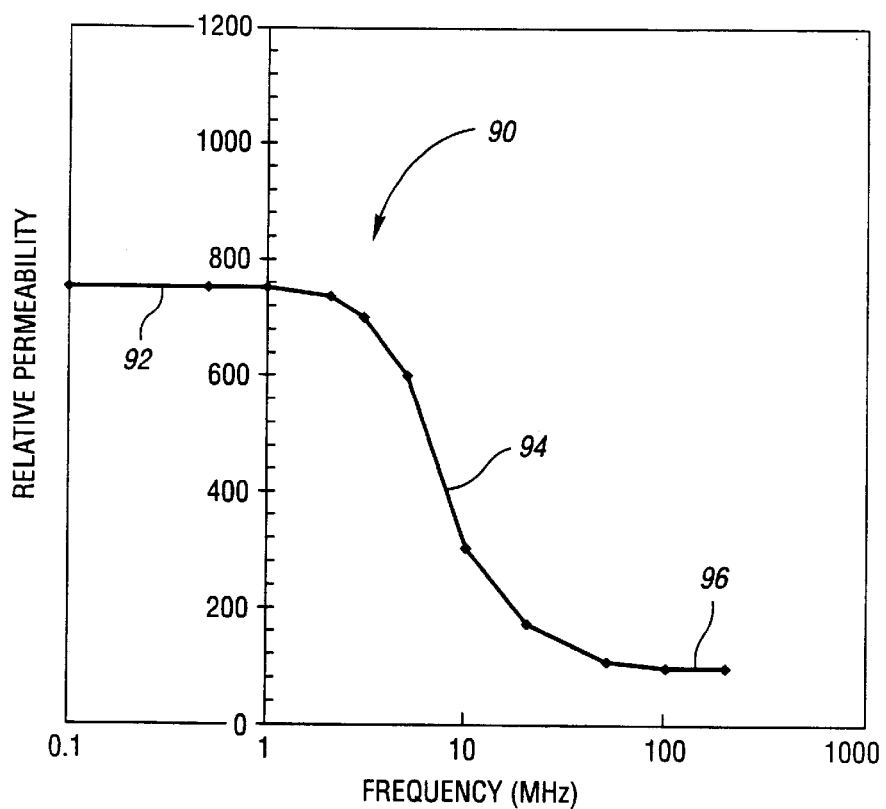
FIG. 5 is a conceptualized graph showing relative permeability as a function of frequency for magnetic material that may be used to make a thin film write head.

Referring now to FIG. 5, a conceptualized graph of relative permeability as a function of frequency for a magnetic material that may be used to make a thin film write head is shown. In general, the greater the relative permeability, the more efficient will be an electromagnet made from the material. Hence, an input current of a given amplitude will produce a greater field head strength.

The relative permeability curve, shown generally by 90, has a high relative permeability in flat portion 92 at low frequencies, transition portion 94, and a low relative permeability in flat portion 96 at frequencies above transition portion 94. In high relative permeability portion 92, the permeability effect is predominantly due to domain wall motion in the magnetic material. In low relative permeability portion 96, the permeability effect is predominantly due to magnetization rotation.

Typically, the frequency corresponding to the maximum rate at which data transitions 24 can occur in input write signal 22 is less than frequencies seen in transition portion 94. Also, typically, the frequency of equalization pulses 36 is greater than the frequencies for transition portion 94. Hence, an electromagnet formed from a material described by permeability curve 90 will have a much lower efficiency for writing equalization pulses 36 than for data transitions 24. Hence, a greater amplitude for input current will be required to produce high frequency fields 40 than for data fields 28,30 having the same field strength as high frequency fields 40.

A solution is to have a first region of a write head operative to write equalization pulses by converting input current with a first amplitude at the equalization frequency to magnetic flux through magnetization rotation. A second region of the write head is operative to write data transitions by converting input current with a second amplitude at data frequencies to magnetic flux through domain movement. The second region is designed to saturate such that, if the first amplitude is substantially equal to the second amplitude, the magnetic flux produced by magnetization rotation will produce substantially the same field strength on tape 38 as the magnetic flux produced by domain movement. In a preferred embodiment, the first region and the second region are a common region.

Figure 6:
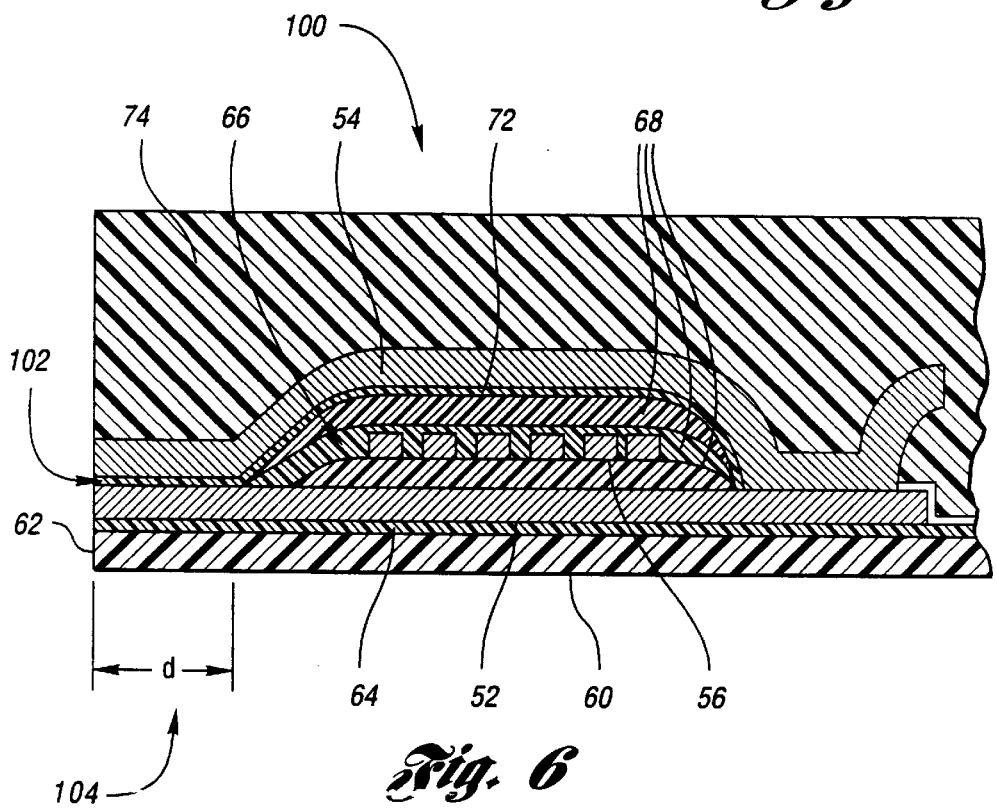
FIG. 6 is a conceptualized cross-sectional drawing of a thin film write head according to an embodiment of the present invention.

Referring now to FIG. 6, a conceptualized cross-sectional drawing of a thin film write head according to an embodiment of the present invention is shown. Thin film write head 100 is constructed of the same material and in the same fashion as write head 50. The difference between write head 50 and write head 100 is in the geometry of gap 102 as compared to gap 58. In particular, gap depth 104 is adjusted such that conversion of the input current at the data frequency results in substantially the same head field amplitude at gap 102 as conversion of the input current at the equalization frequency.

Figure 7:
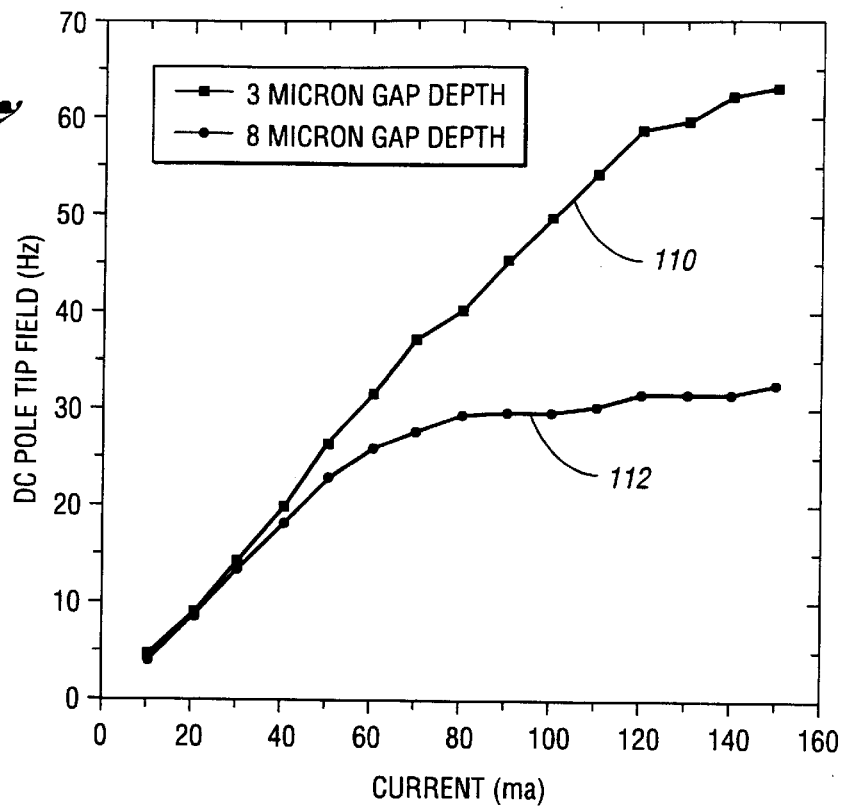
FIG. 7 is a graph comparing relative field strength to input current amplitude for a prior thin film write head and a thin film write head according to an embodiment of the present invention.
Figure 9:
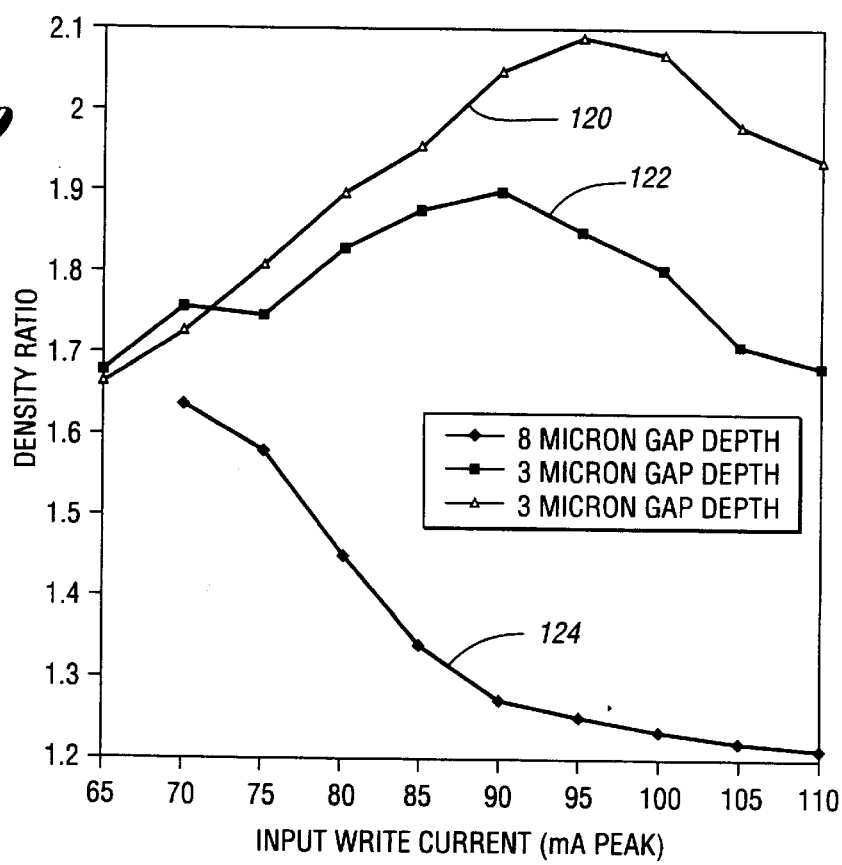
FIG. 9 is a graph of density ratio as a function of input current amplitude for two prior thin film write heads and a thin film write head according to an embodiment of the present invention.
Figure 8:
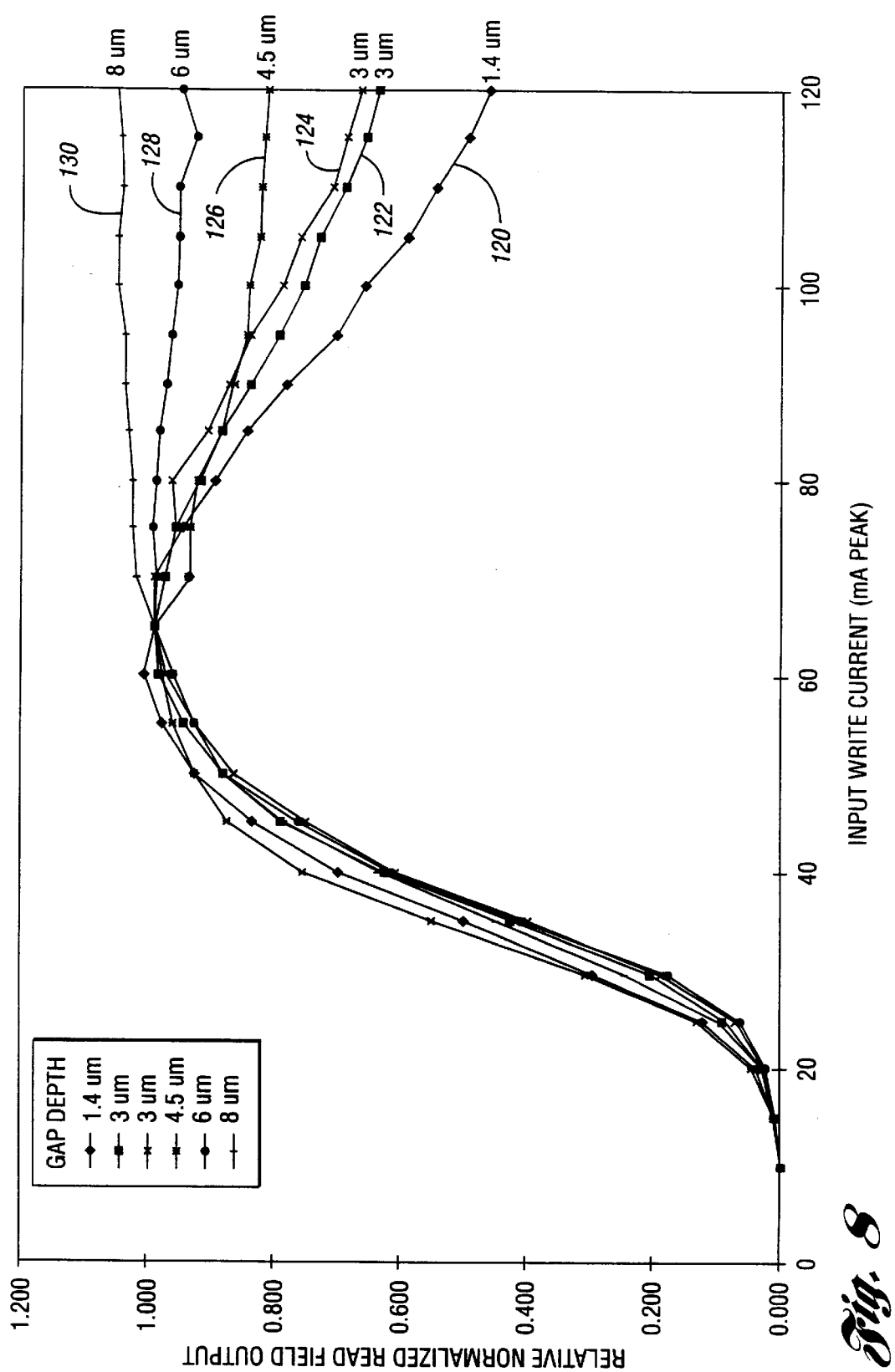
FIG. 8 is a graph showing normalized read back amplitude as a function of input current amplitude for members of a family of thin film write heads with varying gap depths recording on tape.

Referring now to FIGS. 7–9, results of tests on prior thin film write heads and thin film write heads according to the present invention are shown. Write heads tested had constructions as shown with regard to FIGS. 4 and 6 above.

Referring now to FIG. 7, a graph comparing relative field strength to input current amplitude for a prior thin film write head and a thin film write head according to an embodiment of the present invention is shown. The graph shows relative head field strength as a function of DC current for write head 50 having gap depth 76 of three microns (micrometers), as shown by curve 110, and for write head 110 having gap depth 104 of eight microns, as shown by curve 112. The relative head field strength was measured using a magnetic force microscope. The magnetic force microscope has an oscillating tip with a frequency of oscillation proportional to the field strength. Curve 110 for prior write head 50 shows a relatively steady increase in head field strength for increasing input current. Curve 112, however, shows write head 100 saturating at around 60 milliamps of input current. A DC input current can be used since the frequency response of write heads 50,100 is relatively constant from DC to beyond the data frequency.

Referring now to FIG. 8, a graph of normalized read signal amplitude as a function of input current amplitude for members of a family of thin film write heads with varying gap depths writing on tape is shown. A family of write heads 50,100 having gap depths 76,104 of 1.4 micrometers, two with 3 micrometers, 4.5 micrometers, 6 micrometers, and 8 micrometers were constructed. Each write head 50,100 was used to write a 2.7 MHz sinusoidal signal onto a magnetic tape at input current peak amplitudes ranging from 10 to 120 milliamps. A read head was used to read the resulting flux from the recorded tape. The graphs in FIG. 8 show results normalized to the read field output strength resulting from an input write current of 65 milliamps. Curve 120 shows the results of a write head with a 1.4 micrometer gap depth. Curves 122 and 124 show the results of two devices, each device having a gap depth 74 of 3 micrometers. Curves 126, 128, and 130 show the result of devices having gap depths 104 of 4.5, 6, and 8 micrometers, respectively.

Each curve 120,122,124,126,128,130, between 10 and 65 milliamps shows an increasing recording amplitude as a function of increasing input current as might be expected from the B-H curve for the CZT material used to form magnetic poles 52,54. Considering curve 120, increasing current beyond 65 milliamps, however, results in decreasing read field output due to a phase effect. Increasing input write current causes the head field to increase, resulting in a corresponding increase across the width and length of tape 38 of the written field. Eventually, the field being currently written interferes with a previously written field, decreasing the strength of the previously written field and producing the phase effect. This effect is well known in tape recording. As gap depth 76,104 is increased, the gap tends to saturate with increasing input current amplitude. Hence, curves 122, 124, 126, 128 and 130 show progressively less decrease in read output (phase effect) for increasing input write current as the gap depth 76,104 is increased.

For the particular write head construction and materials, magnetic tape construction, tape speed, and write signal frequency used, write head 100 having gap depth 104 at least 5 micrometers provides sufficient saturation to input write current. Gap depth 104 should be limited to no greater than 10 micrometers to prevent excessive flux attenuation due to the decreased efficiency of poles 52, 54. In a preferred embodiment, gap depth 104 is 8 micrometers.

Figure 1A:
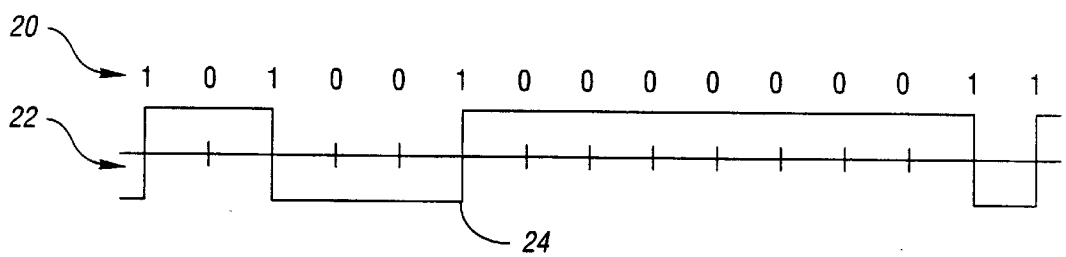
FIG. 1a shows a binary signal data stream and a corresponding conceptualized NRZI input write signal.
Figure 1B:
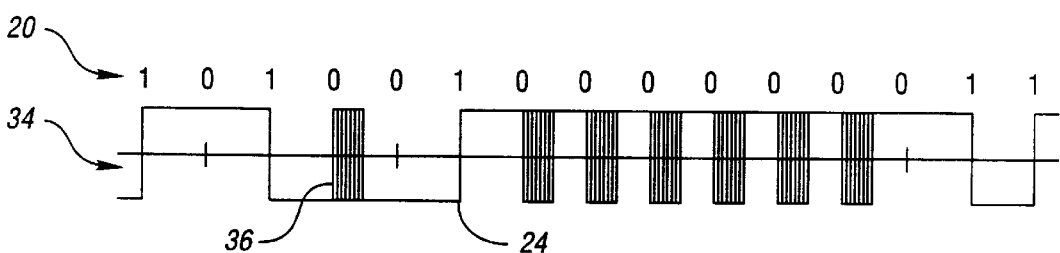
FIG. 1b shows the signal of FIG. 1a with the addition of equalization pulses to produce a write-equalized input signal.
Figure 2A:
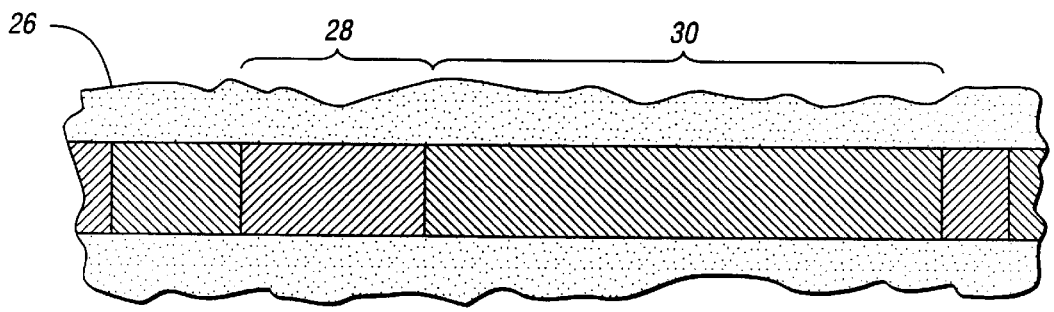
Figure 2B:
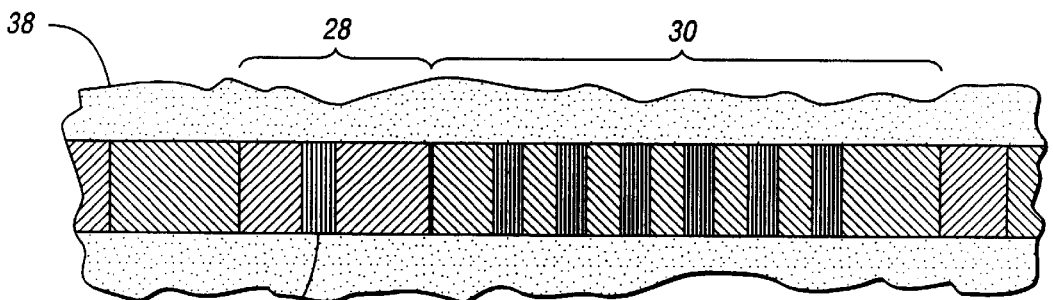
FIG. 2b is a schematic diagram of a tape containing magnetic zones of opposite polarity written by the write-equalized input signal of FIG. 1b.
Figure 3A:
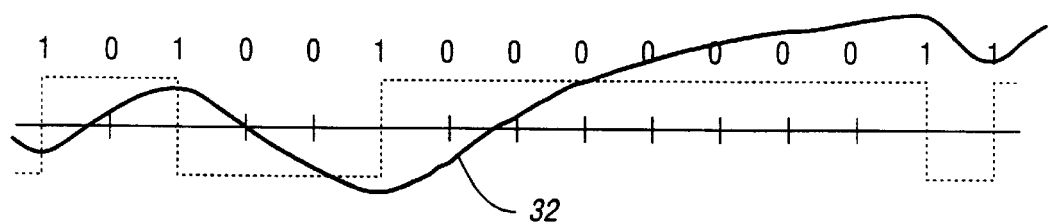
FIG. 3a shows a conceptualized read signal resulting from passing the tape of FIG. 2a over a read head.
Figure 3B:
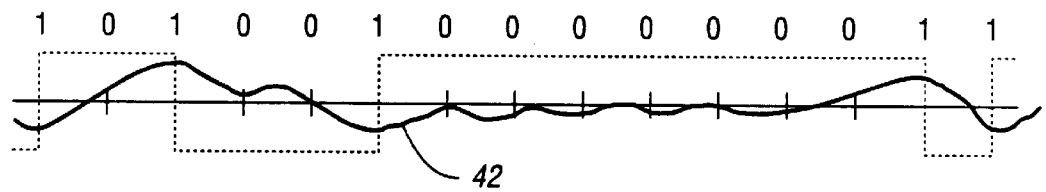
FIG. 3b shows a conceptualized read signal that results from passing the tape shown in FIG. 2b over a read head.

Referring now to FIG. 9, a graph of density ratio as a function of input current amplitude for two prior thin film write heads and a thin film write head according to an embodiment of the present invention is shown. The density ratio is defined as the ratio of the amplitude of a field produced by widely spaced data transitions to the amplitude of a field produced by closely spaced data transitions. For the data graphed in FIG. 9, binary signals 20 consisting of a repeating pattern of a one followed by seven zeros and a pattern of all ones were used. The resulting signals were write equalized as shown in FIG. 1b. Curves 120 and 122 show a density ratio increasing from about 1.7 as the amplitude of input write current increases to about 95 milliamps. After about 95 milliamps, the density ratio decreases in the case of curve 120 to about 1.95 and in the case of curve 122 to about 1.7. In contrast, curve 124 for write head 100 having gap depth 104 of 8 micrometers decreases from a density ratio of 1.65 at 70 milliamps steadily to a density ratio of about 1.2 at 110 milliamps. A density ratio close to 1 is desired. However, a density ratio of less than 1.5 will be considered to result in a field produced by data transitions having substantially the same amplitude as a field produced by equalization pulses which demonstrates an improved level of write equalization.

Figure 10:
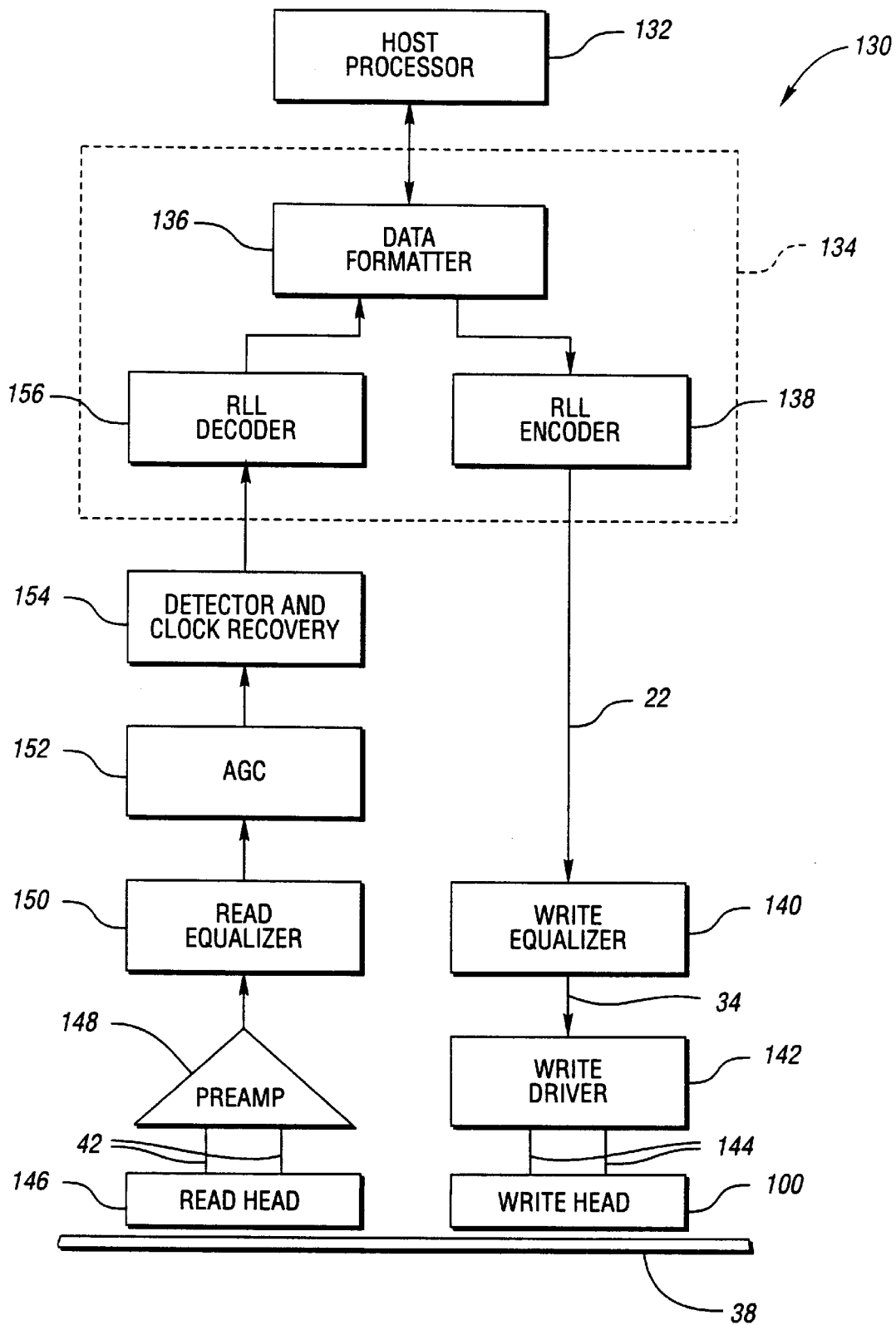
FIG. 10 is a block diagram of a tape deck including a write head according to the present invention.

Referring now to FIG. 10, a block diagram of a tape deck including a write head according to the present invention is shown. A tape deck, shown generally by 130, can receive data from host processor 132 and write a representation of the data on tape 38. Tape deck 130 can also read a data representation from tape 38 and send the data to host processor 132.

Host interface 134 receives data from and transmits data to host processor 132. Host interface 134 may include data formatter 136 to properly format data for writing to a magnetic medium. This format may contain special fields to identify each record as being unique, provide the record length, describe the compression status of the record, determine how data is to be spread across one or more tracks, or the like. Host interface 134 may also include an encoder such as run length limited (RLL) encoder 138. RLL encoder 138 converts data to a format that may be more easily detected. This conversion may limit the number of consecutive zeros in the data stream. This conversion may also restrict the number of consecutive ones in the data stream. Once processed by host interface 134, input write signal 22 from host processor 132 is in a format for writing onto magnetic tape 38.

Write equalizer 140 pre-distorts input write signal 22 in a manner that enables more robust detection during subsequent read operations. In particular, high frequency equalization pulses 36 may be inserted into input write signal 22 to form write-equalized input signal 34. The insertion of equalization pulses 36 reduces the dynamic range in read output signal 42 reproduced from magnetic tape 38. The inclusion of write head 100 in tape deck 130 allows simpler circuitry to be used for write equalizer 140 since high frequency gain for write-equalized input signal 34 is no longer required.

Write driver 142 converts write-equalized input signal 34 from write equalizer 140 into write current 144 having alternating polarities. The magnitude of write current 144 may be adjusted to optimize error performance.

Write head 100 converts write current 144 from write driver 142 into a head field which writes fields 28,30,40 onto tape 38. Write head 100 is described with regards to FIGS. 5 through 9 above. The use of write head 100 in tape deck 130 provides many benefits, including permitting sufficient content of equalization pulses 36 in write-equalized input signal 34. This reduces the magnitude of low frequency components in the head field. Since low frequency components produce greater record depth on tape 38, the use of write head 100 generally reduces and makes more uniform the record depth. Reduced record depth reduces the probability of having a significant amount of a previous field 28,30,40 remaining on tape 38 after writing a new field 28,30,40 over the previous field 28,30,40. Also, reduced and uniform record depths permit tape 38 to be moved over write head 100 and read head 146 with a velocity in a wider range of velocities than would be otherwise possible.

Read head 146 reads fields 28,30,40 from tape 38. Read head 146 may be built as an inductive sensor or, preferably, as a magnetoresistive (MR) sensor. Generally, high frequency fields 40 are recorded at a frequency that lies outside of the working range of read head 146 and, hence, do not directly affect the read portion of tape deck 130. However, if the magnitude of high frequency fields 40 is not sufficient, excessive low frequency content will appear in read output signal 42. Since MR read head 146 exhibits nonlinearities generating evenorder order harmonics, the excessive low frequency components will distort read output signal 42.

Preamp 148 amplifies read output signal 42. If read head 146 is an MR read head, preamp 148 may also include a bias supply to provide the required bias for MR read head 146.

Read equalizer 150 shapes amplified read output signal 42. Shaping may include one or more of amplitude equalization as a function of frequency, pulse shaping to reduce the width of isolated pulses, low pass filtering to improve read signal-to-noise ratio, and the like. If the magnitudes of low frequency components in read output signal 42 are reduced, less pulse spreading occurs. Hence, read equalizer 150 does not need to perform as much shaping. Since shaping that narrows pulses or sharpens transitions boosts high frequency components and, hence, high frequency noise, less noise reduction is required. Therefore, the circuitry for read equalizer 150 is simplified by including write head 100 in tape deck 130.

Automatic gain control (AGC) 152 normalizes the output of read equalizer 150. All read heads 146 exhibit variations in output amplitude. Also, system variations such as write current 144 magnitude, spacing between heads 100,146 and tape 38, and the like contribute to amplitude variation. AGC 152 reduces this variation.

Detector and clock recovery 154 accepts the magnitude normalized read signal and determines the location in time of recorded transitions between data fields 28,30. Clock recovery determines the reference frequency and phase required to determine transition locations.

If host interface 134 includes RLL encoder 138, it must also include RLL decoder 156. RLL decoder 156 undoes the encoding performed by RLL encoder 138. Data formatter 136 accepts the unencoded data stream and formats the data for reception by host processor 132.

While the best mode for carrying out the invention has been described in detail, other implementations are possible within the spirit and scope of the present invention. For example, gap width and gap thickness may be modified. Also, a portion of the top pole, the bottom pole, or both may be narrowed within the gap to produce similar effects.

The best mode described above corresponds to a particular combination of write head construction, magnetic tape construction, tape speed, data rate, equalization technique, and write head materials used. Variations in the numerical results obtained can be expected by changing one or more of these variables.

Those familiar with the art to which this invention relates will recognize various alternative designs and embodiments for practicing the invention as described by the following claims.

What is claimed is:

1. A thin film write head for writing a write-equalized digital data stream onto magnetic tape, the write-equalized data stream comprising data transitions and equalization pulses, wherein the data transitions occur at a frequency no greater than a data frequency and wherein each equalization pulse is a signal written at an equalization frequency, the equalization frequency much greater than the data frequency, the thin film write head comprising:

a top pole;

a bottom pole;

a conductive coil disposed between a first portion of the top pole and the bottom pole, the top pole, bottom pole, and conductive coil forming an electromagnet operative to write the write-equalized digital data stream onto the magnetic tape by converting an input current through the conductive coil into a head field, the input current magnitude for data transitions expressed as a data transition amplitude; and an insulating gap layer disposed between a second portion of the top pole and the bottom pole, the top pole, the bottom pole and the gap layer forming a gap in the electromagnet, the head field generated across the gap, the gap having a gap depth causing saturation to write current at the data frequency and data transition amplitude, wherein, for an amplitude of equalization pulses substantially the same as the data transition amplitude, the gap depth result in substantially the same head field amplitude for equalization pulses as for data transitions.

2. A thin film write head as in claim 1 wherein the top pole and the bottom pole are comprised of cobalt-zirconium-tantalum (CZT), the gap layer thickness is approximately 0.6 to 0.7 micrometers, the gap has a gap width of 36 micrometers, and the gap depth is between five micrometers and ten micrometers.

3. A thin film write head as in claim 2 wherein the gap depth is eight micrometers.

4. A thin film write head as in claim 2 wherein the data frequency is no greater than 3 MHz and the equalization frequency is between 16 MHz and 100 MHz.

5. A thin film write head for writing a write-equalized digital data stream onto magnetic tape in response to an input current, the write-equalized data stream comprising data transitions and equalization pulses, the data transitions occurring at a frequency no greater than a data frequency and each equalization pulse comprising a signal written at an equalization frequency, the equalization frequency much greater than the data frequency, the write head comprising a write gap operative to write equalization pulses by converting input current with a first amplitude at the equalization frequency to magnetic flux through magnetization rotation and to write data transitions by converting input current with a second amplitude at data frequencies to magnetic flux through domain movement, the gap having a gap depth set such that, if the first amplitude is substantially equal to the second amplitude, the magnetic flux produced by magnetization rotation will produce substantially the same field strength on the tape as the magnetic flux produced by domain movement.

6. A thin film write as in claim 5 wherein the data frequency is no greater than 3 MHz and the equalization frequency is between 16 MHz and 100 MHz.

7. A thin film write head as in claim 5, the tape having a tape surface written as it passes by the write gap, the gap comprising a region having a top pole parallel to a bottom pole, the top pole and the bottom pole normal to the tape surface, and having the top pole separated from the bottom pole by a narrow insulating gap layer, the gap depth extending the length of the narrow insulating gap layer in a direction normal to the tape surface.

8. A thin film write head as in claim 7 wherein the top pole and the bottom pole are comprised of cobalt-zirconium-tantalum (CZT), the gap layer thickness is approximately 0.6 to 0.7 micrometers, the gap has a gap width of 36 micrometers, and the gap depth is between five micrometers and ten micrometers.

9. A thin film write head as in claim 8 wherein the gap depth is eight micrometers.

10. A thin film write head for writing a write-equalized digital data stream onto a surface of a magnetic tape, the write-equalized data stream comprising data transitions and equalization pulses, wherein the data transitions occur at a frequency no greater than the data frequency and wherein each equalization pulse is a signal written at an equalization frequency, the equalization frequency much greater than the data frequency, the thin film write head comprising:

a substrate having an end over which the magnetic tape will pass;

an insulation layer deposited on the substrate;

a magnetic bottom pole deposited on the insulation layer;

a coil structure built over a first portion of the bottom pole located away from the end of the substrate over which the magnetic tape will pass;

an insulating gap layer over the coil structure and a second portion of the bottom pole, the second portion defining a region located near the end of the substrate over which the magnetic tape will pass and not covered by the coil structure; and a magnetic top pole deposited on the gap layer, the top pole, the bottom pole, and the coil structure forming an electromagnet operative to write the write-equalized digital data stream onto the magnetic tape by converting an input current through the coil structure to a head field;

wherein a gap is comprised of the second portion of the bottom pole, a portion of the gap layer above the second portion of the bottom pole, and a portion of the top pole above the second portion of the bottom pole, the gap having a gap depth extending the length of the gap layer above the second portion of the bottom pole in a direction normal to the tape surface; and wherein the gap depth is set such that saturation occurs at the data frequency thereby generating substantially the same head field amplitude as conversion of the input current at the equalization frequency.

11. A thin film write head as in claim 10 wherein the data frequency is no greater than 3 MHZ and the equalization frequency is between 16 MHZ and 100 MHZ.

12. A thin film write head as in claim 10 wherein the top pole and the bottom pole are comprised of cobalt-zirconium-tantalum (CZT), the gap layer thickness is approximately 0.6 to 0.7 micrometers, the gap has a gap width of 36 micrometers, and the gap depth is between five micrometers and ten micrometers.

13. A thin film write head as in claim 12 wherein the gap depth is eight micrometers.

14. A tape deck for writing write-equalized digital data streams onto magnetic tape comprising:

a host interface operable to receive data from a host processor and produce an input write signal with a data format suitable for writing on the tape;

a write equalizer in communication with the host interface, the write equalizer operable to receive the input write signal and produce a write-equalized input signal comprising data transitions and equalization pulses, the data transitions occurring at a frequency no greater than a data frequency and wherein each equalization pulse is a signal written at an equalization frequency, the equalization frequency much greater than the data frequency;

a write driver in communication with the write equalizer, the write driver operable convert the write-equalized input signal into a write current; and a thin film write head comprising a top pole, a bottom pole, a conductive coil disposed between a first portion of the top pole and the bottom pole, the top pole, bottom pole, and conductive coil forming an electromagnet operative to write the write-equalized digital data stream onto the magnetic tape by converting an input current through the conductive coil into a head field, the input current magnitude for data transitions expressed as a data transition amplitude, and an insulating gap layer disposed between a second portion of the top pole and the bottom pole, the top pole, the bottom pole and the gap layer forming a gap in the electromagnet, the head field generated across the gap, the gap having a gap depth extended to cause saturation to write current at the data frequency and data transition amplitude.

15. A tape deck as in claim 14 wherein, for an amplitude of equalization pulses substantially the same as the data transition amplitude, the gap depth result in substantially the same head field amplitude for equalization pulses as for data transitions.

16. A tape deck as in claim 14 wherein the top pole and the bottom pole are comprised of cobalt-zirconium-tantalum (CZT), the gap layer thickness is approximately 0.6 to 0.7 micrometers, the gap has a gap width of 36 micrometers, and the gap depth is between five micrometers and ten micrometers.

17. A tape deck as in claim 14 wherein the gap depth is eight micrometers.

18. A tape deck as in claim 14 wherein the data frequency is no greater than 3 MHz and the equaization frequency is between 16 MHz and 100 MHz.

* * * * *